June 14, 1966 J. H. JOHNSON 3,255,996
CABLE INSTALLING DEVICE
Filed Dec. 11, 1963 2 Sheets-Sheet 1

INVENTOR
JARVIS H. JOHNSON

BY *Ayata Dowell F+H*
ATTORNEY

June 14, 1966  J. H. JOHNSON  3,255,996
CABLE INSTALLING DEVICE
Filed Dec. 11, 1963  2 Sheets-Sheet 2
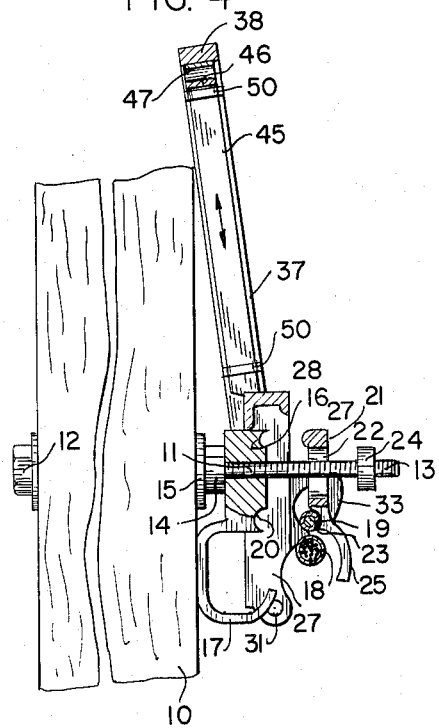
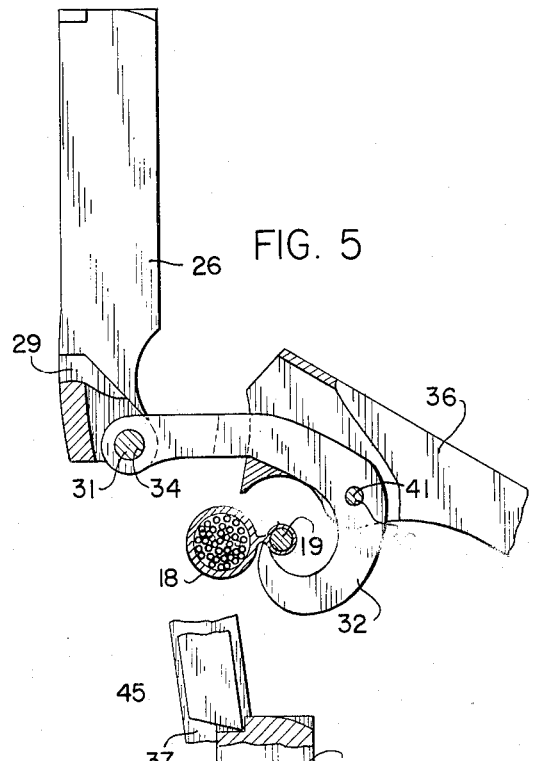
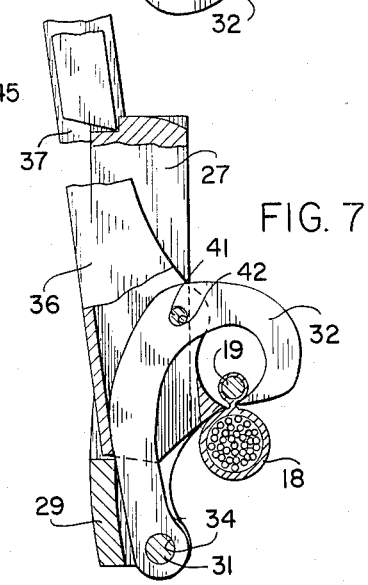
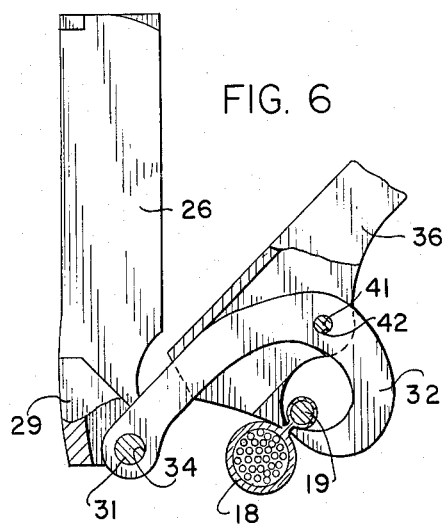
INVENTOR
JARVIS H. JOHNSON
BY
ATTORNEY

United States Patent Office 3,255,996
Patented June 14, 1966

3,255,996
CABLE INSTALLING DEVICE
Jarvis H. Johnson, Groveland, Fla.
(2110 S. Orange Ave., Ocala, Fla. 32670)
Filed Dec. 11, 1963, Ser. No. 329,727
6 Claims. (Cl. 254—134.3)

This invention relates to communication including by means of lines extending from one location to another and to equipment by which such lines are installed in order that messages may be transmitted by means thereof.

The invention relates particularly to the installation of cables containing many individual lines, wires or conductors in an outer sheath, and along which a steel strand is attached for providing support for the communications cable and which steel strand is generally referred to as a "messenger cable."

Installation of the connected generally parallel communications and messenger cables, the configuration of which in cross-section is generally similar to a figure eight, has been difficult requiring two men to elevate the cable to its final position after the cable has been inserted loosely in each mounting bracket, it being customary to turn a segment of the bracket to an upper inoperative position until the cable is in its final position at which time the bracket is turned downward and tightened in such position to secure the cable in place, the installing of the cable usually requiring that it be given a complete twist approximately each 14 feet to prevent wind oscillation. The mounting bracket is supported on a bolt through an upright post or the like support.

It is an object of the invention to provide a combination cable lifter, cable twister or turner, and attaching member by means of which the installation of a combination communications and messenger cable can be quickly and easily accomplished by a workman unassisted.

Another object of the invention is to provide a leverage device for mounting combined figure eight communications and messenger cables from a lower position in a mounting bracket to a final position by the provision of a simple cable lifter and the swinging of the same in a manner to provide sufficient leverage to rotate and elevate the cable.

Figure 1:
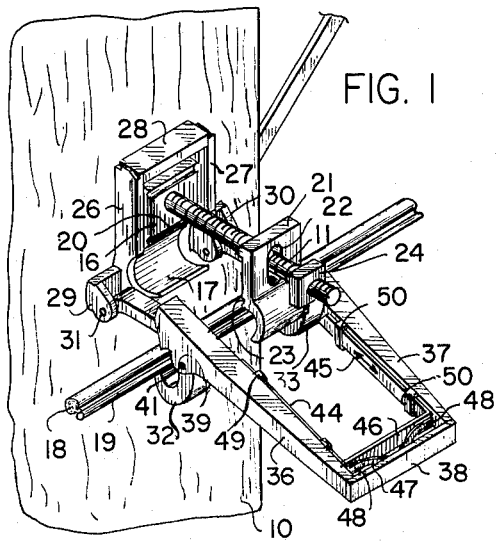
Figure 2:
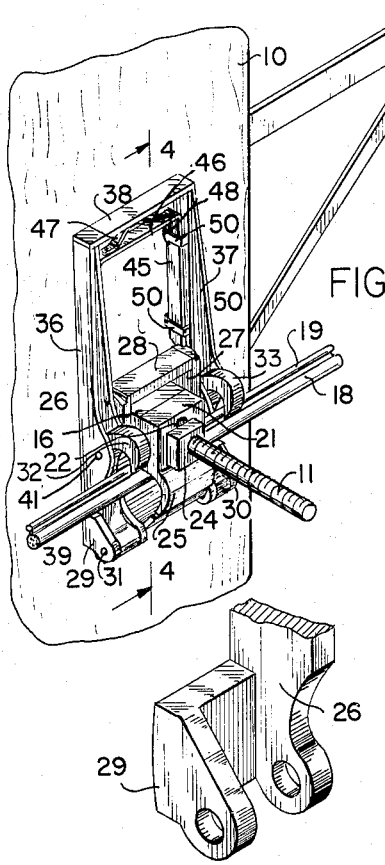
Figure 3:
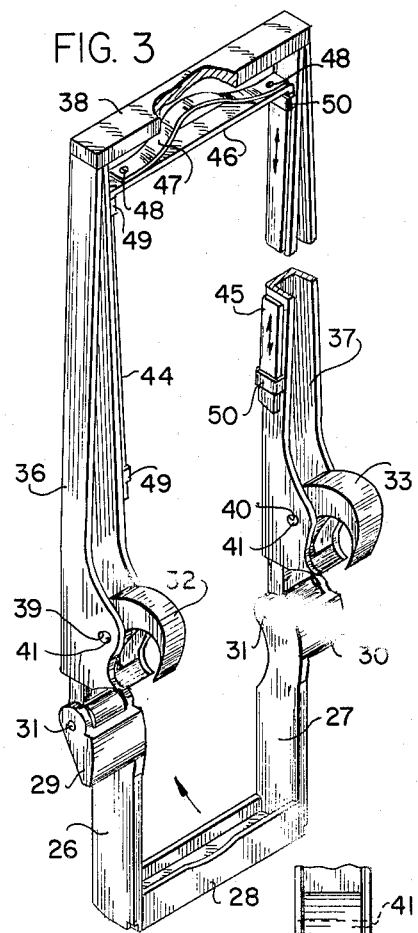
Figures 8, 9:
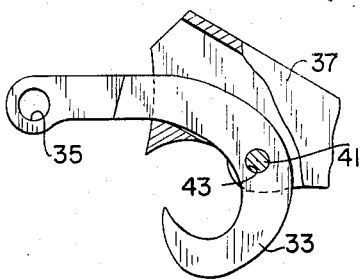
Figure 10:
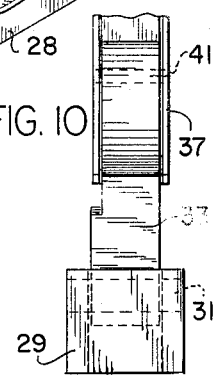

Other objects and advantages of the invention will be apparent from the following description taken in conjunction with the accompanying drawings in which:

FIG. 1 is a perspective illustrating the manner in which the invention is applied;

FIG. 2, a perspective of the parts in the final or locked position;

FIG. 3, a perspective of the cable installing device;

FIG. 4, a side elevation partly in section of the device in final or locked position;

FIGS. 5, 6 and 7, fragmentary side elevations of the device in its initial, intermediate, and final or locked positions;

FIG. 8, a fragmentary detail perspective of the lower end of the bracket on which the lever mechanism is pivoted;

FIG. 9, a fragmentary side elevation of the messenger cable engaging hooks pivotally attached to the arms of FIG. 8; and, FIG. 10, an end view of the open end of the hook of FIG. 9.

Briefly stated the invention is a line lifter designed for lifting a plastic jacketed telephone cable with an attached steel strand or messenger cable by which it is mounted on poles and suspended in the air. The lifter is a generally U-shaped bracket adapted to be applied inverted over a two-part clamping device by which a suspended line is mounted on a pole. To the lower free ends of the bracket are pivoted the remote arms of hooks disposed in inverted position, the curved portion of such hooks forming jaws for engagement with one side of the messenger cable and to the hooks is attached an additional leverage device which may be U-shaped and have legs with free ends curved in opposition to the hooks so that when the leverage device is swung upwardly there will be a clamping action on the messenger cable and a lifting upwardly of the cable to the position desired for permanent fastening, in which position the leverage device may be locked in place by spring operated latching means engaging notches in the leverage device to lock the parts in fixed relation. The lifter may be released by squeezing of the handle to release the latch after which it can be lifted from the cable and bracket as soon as the cable is fastened in place. Thus a lineman does not have to lift the cable weighing from 50 to 300 pounds on his shoulder, twist it, place it in the clamp and tighten it, all while supporting and maintaining the cable in the proper position. The required twisting of the cable between poles likewise can be easily accomplished by fastening the lifter to the cable in a location offset from the bracket and using the handle as a lever to perform such twisting operation.

With continued reference to the drawings, the present invention is a device for elevating the communications and messenger cables and in order to explain the invention it is necessary to explain the environment in which it is used. Referring to FIG. 4, upon a post 10 is mounted a bolt 11 having a head 12 and threads 13, the bolt being fastened in place by a nut 14 bearing against a plate 15 between which and the head of the bolt the post 10 is clamped. A bracket 16 is carried on the bolt 11 and has a generally C-shaped supporting portion 17 in which a communications cable 18 is adapted to be loosely inserted, later to be elevated and secured in fixed position. The cable 18 houses multiple wires or conductors inside an outer sheet and an additional support means is provided therefor in the form of a steel strand 19 generally referred to as a messenger cable. Initially the cable 18 is inserted in the C-shaped supporting portion 17 of the bracket 16 where it is retained loosely. Means is provided for fastening the steel strand or messenger cable 19 in a fixed position relative to the bracket 16 and for this purpose the bracket is provided with a curved jaw 20 adapted to fit snugly the messenger cable, and the bracket 16 is provided with a closure member 21 having a vertical slot 22 through which the bolt 11 is located. The closure member 21 has a curved jaw 23 between it and the opposite jaw 20 through which the messenger cable 19 is adapted to be clamped by the mere tightening of a nut 24 on the bolt 11. The closure member 21 which forms a part of the bracket has a depending projection 25 which fills the gap in the C-shaped supporting portion 17 after the communications cable 18 has been inserted. Prior to insertion the closure member 21 is rotated 180° from the position in which it is shown in FIG. 4 to permit the insertion of the communications and messenger cables.

The lifting of communications and messenger cables requires two workmen of skill and strength and the present invention is directed to the elevation of the cable easily with minimum effort by a single workman and without requiring great strength. The present invention provides means whereby the messenger and communications cables can be readily and easily raised to lift the messenger cable 19 between the curved surfaces or jaws 20 and 23 so that the nut 24 can be tightened to clamp the messenger cable therebetween with the communications cable located within the members 17 and 25.

The cable lifter or installing device of the present invention has a pair of parallel legs 26 and 27 connected at one end by a crossbar 28 and providing a yoke of a size and adapted, when used, to be placed over the bracket 16 on the post 10. For increased size and strength the legs 26 and 27 may be provided with enlarged hinge portions 29 and 30 for connection by hinge pins or pivots 31, with hooks 32 and 33 having hinge openings 34 and 35 (FIGS. 5–9) in which the hinge pins 31 are received.

The hooks 32 and 33 are attached to the brackets 29 and 30 by means of the hinge pins or pivots 31, the hooks being provided with hinge openings 34 and 35 for the receipt of such hinge pins 31. The hooks are of a size to fit snugly about the messenger cable 19 and when so located to be swung about the pivots 31 to cause elevation or lifting of the messenger cable and the communications cable to which it is attached. Means therefore is provided for producing the elevational swinging of the hooks and for maintaining the messenger cable within the curvature of the hooks while such operation is being performed.

Such mechanism includes a pair of levers 36 and 37 and a crossbar 38 (FIG. 3). The levers 36 and 37 may be of generally U-shaped cross-section tapering from their ends connected by the bar 38 to their opposite ends with the sidewalls near such opposite ends receiving the hooks 32 and 33 therebetween and having openings 39 and 40 for the receipt of pivots 41 having axes substantially parallel to the hooks for receiving the cable to be elevated which extend through openings 42 and 43 in the hooks 32 and 33.

The hooks 32 and 33 have relatively straight leg portions and when such leg portions and the operating bars are in straight-line position the messenger cable will be gripped between the hooks and the operating levers. Further movement of the operating levers will then swing the cable upwardly until it is between the curved jaws 20 and 23 when the nut 24 can be tightened to clamp the messenger cable in fixed position between such jaws 20 and 23. In this position the operating levers will be in upright position as shown in FIG. 4 and latch means is provided in the form of a yoke having legs 44 and 45 connected by a crossbar 46, normally urged in latching position away from the crossbar connecting the end of the lever by a spring 47 held in place by rivets 48. The legs 44 and 45 are slidable through brackets 49 and 50 and the extremities of the legs are adapted to come in contact with the upper ends of the legs 26 and 27.

In the operation of the device the communications cable 18 and messenger cable 19 are placed in the supporting portion 17 of the bracket 16 fastened to the post 10 by means of bolt 11, after which the device of the present invention is operated. In so doing the legs 26 and 27 and crossbar 28 are placed over the bracket 16 with the hooks and operating levers in the position shown in FIG. 5 substantially equidistant from the messenger cable. The messenger cable is inserted between the curved surfaces of the hooks and the opposed curved portions of the operating levers, the outer ends of the operating levers being at a slightly lower elevation than the hooks. Then the operating levers are swung slightly about their pivots and transversely of the length of the messenger cable by having their outer ends raised so that the legs of the hooks and the operating bars are substantially in straight lines. With the cable clamped therebetween, then the operating levers are swung from substantially horizontal position upwardly about the length of the messenger cable approximately 90° to the position shown in FIG. 4, whereupon the latch will engage allowing the workman's hands to be free to tighten the nut 24 and secure the messenger cable 19 between the curved jaws 20 and 23. It will be apparent therefore that a simple mechanical device is provided by which a difficult job is made easy.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A cable installing device comprising a body having a pair of spaced legs and a connection between them at one end providing a mounting yoke adapted to be placed with its legs depending over a bracket by which communications and supporting messenger cables are adapted to be secured on a post, a pair of hooks pivoted to the unconnected ends of said yoke, said hooks having generally curved portions of a size and configuration to fit about a cable to be lifted, operating lever mechanism having curved portions of a size and configuration to fit about the cable to be lifted in opposition to the curved portions of said hooks to clampingly retain the cable therebetween when the hooks and operating lever are in straight-line position, said operating lever mechanism being pivotally connected to said hooks and extending in straight-line position along said hooks when said curved portions are in cable gripping relation, whereby a cable may be clampingly received within said curved portions and said operating lever mechanism may be swung to move said cable upwardly to a position to be retained, and latch mechanism for performing such retaining action.

2. A cable installing device comprising a body having a pair of spaced legs and a connection between them providing a mounting yoke adapted to be placed with its legs depending over a bracket by which communications and supporting messenger cables are adapted to be secured on a post, a pair of hooks pivoted to said yoke said hooks having generally curved portions of a size and configuration to fit about a cable to be lifted, operating lever mechanism pivotally connected to said hooks and having curved portions of a size and configuration to fit about the cable to be lifted in opposition to the curved portions of said hooks to clampingly retain the cable therebetween, whereby a cable may be clampingly received within said curved portions and said operating lever mechanism may be swung to move said cable upwardly to a position to be retained, and latch mechanism for performing such retaining action.

3. A cable installing device having depending legs adapted to be placed over a bracket by which communications and supporting messenger cables are adapted to be secured on a post, a pair of hooks pivoted to the lower end portions of said legs, said hooks having generally curved portions of a size and configuration to fit about a cable to be lifted, operating lever mechanism pivotally connected to said hooks and having curved portions of a size and configuration to fit about the cable to be lifted in opposition to the curved portions of said hooks to clampingly retain the cable therebetween, whereby a cable may be clampingly received within said curved portions and said operating lever mechanism may be swung to move said cable upwardly to a position to be retained, and latch mechanism for performing such retaining action.

4. A device for elevating a cable during installation comprising a mounting member for disposition over a bracket by which communications and supporting messenger cables are fastened in place, said mounting member having spaced legs, elongated cable gripping means including hooks pivotally connected to the lower end portions of said legs by pivots disposed generally parallel to the hooks for receiving a cable to be elevated, and means whereby said cable gripping means may be operated as a lever to swing said cable gripping means with a cable gripped thereby to an elevated position.

5. The combination in a device for raising a cable for installation thereof, of mounting means, lever means pivotally attached to said mounting means to raise a cable, said lever means having relatively movable jaws operable to grip and retain said cable gripped during operation of said lever means to raise a cable, said lever means being carried on pivots substantially parallel to said relatively movable jaws.

6. The structure of claim 5 and holding means by which said lever may be employed to maintain said cable gripped and in elevated position to allow time for securing the said cable in its final position.

References Cited by the Examiner
UNITED STATES PATENTS
3,090,827  5/1963  Mahaney.

FOREIGN PATENTS
120,919  11/1919  Great Britain.

WILLIAM FELDMAN, *Primary Examiner.*
O. M. SIMPSON, *Assistant Examiner.*